(12) United States Patent
Miryala

(10) Patent No.: US 10,198,091 B2
(45) Date of Patent: Feb. 5, 2019

(54) WRITING IMPLEMENT

(71) Applicant: MASTERCARD ASIA/PACIFIC PTE. LTD., Singapore (SG)

(72) Inventor: Sunitha Miryala, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 0 days.

(21) Appl. No.: 15/653,882

(22) Filed: Jul. 19, 2017

(65) Prior Publication Data

US 2018/0032162 A1 Feb. 1, 2018

(30) Foreign Application Priority Data

Jul. 29, 2016 (SG) .................... 10201606280P

(51) Int. Cl.

| G06K 5/00 | (2006.01) |
|---|---|
| G06F 3/0354 | (2013.01) |
| G06F 21/31 | (2013.01) |
| G06F 21/83 | (2013.01) |
| G07C 9/00 | (2006.01) |
| G06F 21/32 | (2013.01) |
| G06F 21/64 | (2013.01) |
| G06Q 20/30 | (2012.01) |
| G06F 21/00 | (2013.01) |

(52) U.S. Cl.
CPC .......... *G06F 3/03545* (2013.01); *G06F 21/31* (2013.01); *G06F 21/32* (2013.01); *G06F 21/64* (2013.01); *G06F 21/83* (2013.01); *G06Q 20/30* (2013.01); *G07C 9/0015* (2013.01); *G06F 21/00* (2013.01); *G07C 9/00* (2013.01)

(58) Field of Classification Search
USPC ................................ 235/380, 375
See application file for complete search history.

(56) References Cited

U.S. PATENT DOCUMENTS

| 6,307,956 | B1* | 10/2001 | Black | G06F 3/03545 382/124 |
|---|---|---|---|---|
| 6,728,881 | B1* | 4/2004 | Karamchetty | G06F 21/34 713/182 |
| 2002/0025062 | A1* | 2/2002 | Black | G06F 3/03545 382/116 |
| 2003/0014327 | A1* | 1/2003 | Skantze | G06Q 20/04 705/26.8 |
| 2005/0122209 | A1* | 6/2005 | Black | G06Q 20/0453 340/5.52 |
| 2005/0180618 | A1* | 8/2005 | Black | G06F 3/03545 382/124 |

(Continued)

FOREIGN PATENT DOCUMENTS

JP 2010-186408 * 8/2010 ............. G06Q 20/00

*Primary Examiner* — Tuyen K Vo
(74) *Attorney, Agent, or Firm* — Budzyn IP Law, LLC

(57) ABSTRACT

Disclosed is a writing implement for effecting an electronic transaction via a payment terminal. The writing implement includes a communications device comprising a payment vehicle identifier. The payment vehicle identifier is associated with a payment vehicle from which funds can be drawn for effecting the electronic transaction. The communications device is configured to send the payment vehicle identifier to the payment terminal. The writing implement also includes a writing member for producing an authenticating mark to authenticate use of the payment vehicle.

15 Claims, 5 Drawing Sheets

(56) References Cited

U.S. PATENT DOCUMENTS

2006/0215886 A1\* 9/2006 Black .................... G06K 9/0002
                                                        382/124
2009/0240625 A1\* 9/2009 Faith ....................... H02J 7/025
                                                         705/65
2011/0313871 A1\* 12/2011 Greenwood ........... G06Q 20/10
                                                         705/16

\* cited by examiner

WRITING IMPLEMENT

TECHNICAL FIELD

The present disclosure relates to a writing implement for effecting an electronic transaction. Such a writing implement may be, for example, a pen that uses ink, a pencil, or a pen with a nib configured to sign on a signature capture pad of a payment terminal (e.g. a point-of-sale (POS) terminal).

BACKGROUND

Credit and debit cards are in increasingly common usage for effecting electronic transactions. Particularly for in-store transactions a cardholder must produce their credit or debit card so that it may be scanned or read, and the payment can then be authorised.

Authorisation can involve inputting a personal identification number (PIN) into a merchant payment terminal, or producing a signature. For a signature to be verified that same signature typically appears on the back of the credit or debit card with which payment is to be made. This leads to a number of problems.

Firstly, a fraudulent user of the credit or debit card has the opportunity to practice replicating the signature such that a convincing reproduction can be produced when effecting an in-store transaction.

Secondly, the credit or debit card details are visible on the card. These details can be stolen, with or without stealing the card, and then used to make purchases online.

It is desired therefore that there be provided an alternative means for effecting transactions that avoids one or more of the abovementioned drawbacks of current systems, or at least provides a useful alternative.

SUMMARY

The present invention provides a writing implement for effecting an electronic transaction via a payment terminal, the writing implement comprising:
  a communications device comprising a payment vehicle identifier, the payment vehicle identifier being associated with a payment vehicle from which funds can be drawn for effecting the electronic transaction, wherein the communications device is configured to send the payment vehicle identifier to the payment terminal; and
  a writing member for producing an authenticating mark to authenticate use of the payment vehicle.

The present invention further provides a method for effecting an electronic transaction, comprising:
  producing, in a writing implement, the authenticating mark;
  activating the communications device upon production of the authenticating mark; and
  sending the payment vehicle details from the communications device to the payment terminal.

The present invention also provides a system for effecting an electronic transaction, comprising:
  a writing implement; and
  a payment terminal configured to receiving the payment vehicle identifier from the communications device of the writing implement.

BRIEF DESCRIPTION OF THE DRAWINGS

Some embodiments will now be described by way of non-limiting example only, with reference to the accompanying drawings in which.

DETAILED DESCRIPTION

Figure 1:
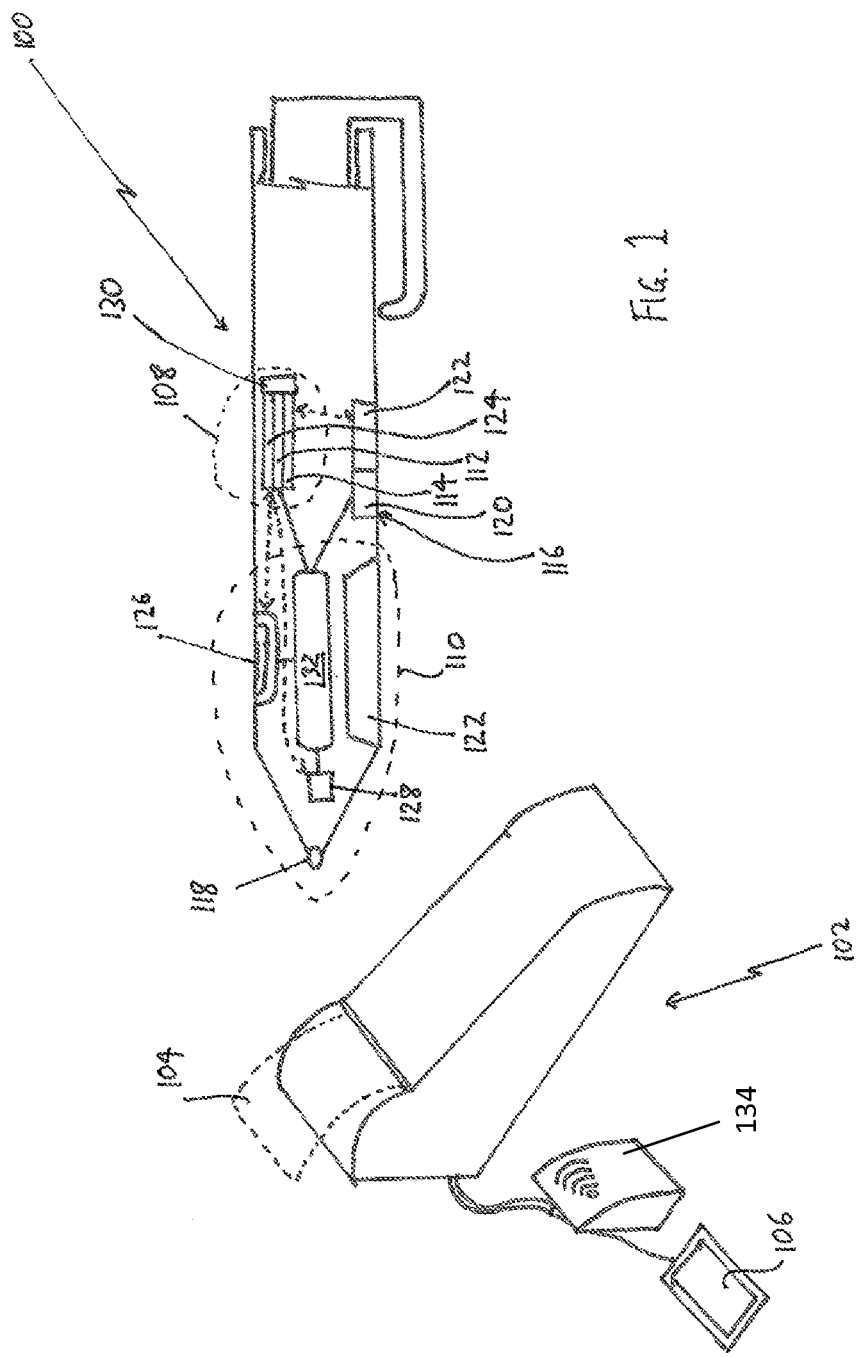
FIG. 1 is a writing implement for use in accordance with present teachings.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

FIG. 1 shows a writing implement, presently embodied by a pen 100, for effecting an electronic transaction via a payment terminal 102. The pen 100 may be configured for general writing—such as signing a receipt 104—or for interaction with a signature capture pad 106. The writing implement may instead comprise a pencil or other writing implement.

The writing implement comprises a communications device 108 and a writing member 110.

The communications device 108 facilitates communications between the writing implement 100 and the payment terminal 102. The communications device 108 is configured to send, to the payment terminal 102, a payment vehicle identifier—the payment vehicle identifier comprises payment vehicle details for identifying a payment vehicle such as a card number, expiry date, card verification value (CVV) in the case where the payment vehicle is a credit or debit card. In some implementations, the communications device 104 operates after the writing implement receives a request, from the payment terminal 102, for payment vehicle details of a payment vehicle (not shown) from which funds can be drawn for effecting the electronic transaction. In some implementations, the communications device 108 is enabled or activated by a user of the writing implement, before the writing implement receives a request for those payment vehicle details.

The communications device 108 comprises a transmitter 112 for wirelessly transmitting the payment vehicle identifier to the payment terminal. The communications device 108 also comprises a memory 114 for storing payment vehicle details of the payment vehicle.

In embodiments where the communications device 108 comprises a NFC chip, the wireless transmitter 112 and memory 114 may form a single component and thus the separate representation of those the wireless transmitter 112 and memory 114 in FIG. 1 is for ease of description only. The NFC chip may be used by tapping the pen 100 on a NFC reader 134 of the payment terminal 102 in a manner similar to that currently performed using credit and debit cards and other devices with contactless payment functionality.

The memory 114 may be for storing the payment vehicle details of a plurality of payment vehicles. The payment vehicle for a particular transaction may then be selected as desired.

The writing implement comprises a payment vehicle selector 116. The payment vehicle selector comprises a button 118 and a display 120. Pressing or touching the button 116 changes the payment vehicle selected for transactions using the pen 100. The button 118 may be a depressible or movable button, or a virtual button.

So that the user knows which payment vehicle is selected for a transaction, an indicator of the payment vehicle is displayed on the screen 120. For example, where the payment vehicle is a credit card, the screen 120 may display "CC" (the indicator) or, where that credit card uses the MasterCard payment network, the screen 120 may display "Master" (the indicator). The user can then repeatedly press the button 118 until the requisite payment vehicle is indicated on the screen 120. Where the button 118 is a virtual button, the button 118 and screen 120 may comprise a single touchscreen element.

The payment vehicle may alternatively be selected on the payment terminal 102 in accordance with current selection processes (e.g. selection of savings, credit or cheque account). Alternatively, the communications device 108 may send to the payment terminal 102 an indicator for each relevant payment vehicle the details of which are stored in the memory 114. The user then selects, on the payment terminal 102, the desired payment vehicle. The payment terminal 102 then sends a request for payment vehicle details of the selected payment vehicle, to the pen 100. The communications device 108:

receives the request comprising the payment vehicle indicator;

identifies the payment vehicle identifier for the relevant payment vehicle; and sends the payment vehicle identifier to the payment terminal for effecting the electronic transaction.

In a further embodiment, the memory 114 may comprise a list of merchants, stores or locations (collectively "venues") for one or more of the payment vehicles. That list (a whitelist) may limit the use of the respective payment vehicle to use at one of the venues identified in the list. The list may comprise merchant category codes and/or specific merchant identifiers and/or specific geographical locations, for example. That list may also facilitate automatic payment vehicle selection at particular venues. The request may then comprise a merchant identifier (e.g. the merchant name or store identifier). In this case, the communications device 108 will determine whether there is a payment vehicle set for automatic selection of when that merchant identifier is received. If such a payment vehicle is identified, the communications device 108 will send to the payment terminal 102 the payment vehicle identifier of that payment vehicle. The same process may be used where the request comprises a list of goods or services to be purchased by the electronic transaction and the list comprises a list of goods for one or more respective payment vehicles, that facilitate automatic selection of the relevant payment vehicle for particular goods or services. Conversely, there may be a list (a blacklist) of venues, goods and/or services at which or for which a particular payment vehicle is precluded from use. Thus the communications device 108 will not send the relevant payment vehicle identifier or identifiers to the payment terminal 102 even where the user attempts to select the corresponding payment vehicle.

The communications device 108 may be configured to receive a receipt or transaction details (e.g. total basket value, basket contents, date of transaction, merchant etc) from the payment terminal 102. The memory 114 may then store the receipt for downloading through WiFi connection, pen-to-phone through NFC or Bluetooth connection, or another means, or by removal of the memory from the pen 100. The memory 114 may also store the receipts in association with the payment vehicle used to make the corresponding transaction. This makes accounting for various transactions easier after the receipts are downloaded.

The request for payment vehicle details is generated by the payment terminal. The request can be made using any mechanism. For example, the communications device 108 comprises a near-field communications (NFC) chip. In this case, where the chip is a passive chip (i.e. cannot read or receive information) the request may simply comprise creation of a magnetic field used to charge the chip to cause it to emit signal corresponding to the payment vehicle details. In such embodiments the writing member 110 is most likely to comprise a standard pen nib or pencil with replaceable pencil leads. Where the communications device 108 comprises an active NFC chip, the request may comprise a signal that requests payment vehicle details and may also request authentication that authenticates the user of the payment vehicle.

The writing member 110 produces an authenticating mark to authenticate use of the payment vehicle. That authentication mark may be a visible mark such as a signature, or may not be visible.

The writing member 110 presently comprises a writing tip or nib 118. The writing tip or nib 118 is for producing a visible authentication mark. For example, the nib 118 can produce a signature that is verifiable against a stored signature associated with the payment vehicle. Where the nib 118 comprises a standard pen nib, the signature produced by the nib may be made on a receipt or payment voucher 104. That signature may be cross-referenced against a signature displayed elsewhere, for example on panel 122. Panel 122 is visible on an external surface of the pen 100 and comprises a static picture (i.e. it is not a powered panel).

The nib 118 may alternatively comprise a virtual signature tip. In other words, the nib 118 may not be connected to an ink reservoir but may instead be configured to produce the authenticating mark on a signature capture pad 106 on the payment terminal 102. From this point, there are a number of processes that can be used to verify the authenticity of the signature. The payment terminal 102 may:

await verification by the merchant or an employee of the merchant that the on the signature capture pad 106 corresponds to that shown on the display panel 122;

send the authenticating mark produced on the signature capture pad 106 to a third party (e.g. the card issuer where the payment vehicle comprises a credit or debit card) for verification, and then await confirmation from the third party before effecting the electronic transaction; or send the authenticating mark to the pen 100. In this case, the communications device 108 is configured to receive, from the payment terminal 102, a signal comprising the authenticating mark. The communications device 108 further comprises a mark verification module 124 for storing an authentication mark associated with the payment vehicle (e.g. storing that mark in memory 114). The mark verification module 124 also then verifies the authentication mark received from the payment terminal 102 corresponds to the stored authentication mark associated with the payment vehicle intended for use in the electronic transaction. The stored authentication mark may be common to all payment vehicles the identifiers of which are stored in the memory 114, or there may be a different mark associated with one or more payment vehicles than that associated with a different one or more payment vehicles the identifiers for which are in memory 114. The communications device 108 is configured to send the payment vehicles details of the relevant payment vehicle, if the received authentication mark (i.e. that produced on pad 106) corresponds to the stored authentication mark. Alternatively, where the payment vehicle details have already been sent to the payment terminal 102, the communications device 108 may send a confirmation signal to the payment terminal to confirm the electronic transaction can be effected, upon verification that the authentication mark corresponds to the authentication mark associated with the payment vehicle.

The writing member 110 comprises a grip 126. The grip 126 comprises a fingerprint or thumbprint scanner for scanning a fingerprint or thumbprint of a user of the writing implement 100. The user's fingerprint or thumbprint (or the fingerprint or thumbprint of multiple users where multiple users are permitted to use the pen 100 or a payment vehicle with identifier stored therein) may be stored in memory 114 for cross-referencing against that which is scanned by grip 126.

The mark verification module 124 may act as a print verifier for determining if a scanned fingerprint or thumbprint corresponds to the stored respective fingerprint or thumbprint. In this case, the authenticating mark will comprise a confirmation from the print verifier that the scanned fingerprint or thumbprint corresponds to the stored respective fingerprint or thumbprint. The communications device 108 is configured to send the payment vehicle details to the payment terminal 102 after receipt of the verifier.

The pen 100 may comprise one or more movement detectors 128 configured to detect movements of the pen 100. Each movement detector 128 may be suitable component—for example, a movement detector may be:

an accelerometer;

a pressure sensor such as a pressure sensor configured to detect pressure applied to the nib 118 in two dimensions corresponding to the plane of a page on which the pen 100 may otherwise write, or three dimensions where strength of pressure or, for example, signature line width is necessary for authentication;

an infrared and/or ultrasonic transceiver to detect changes in position of a surface (not shown) relative to the pen 100 and thereby infer movements of the pen 100;

gyroscope; and magnetometer.

In some embodiments, there may be more than one movement detector. Each movement detector may be of the same type or the pen 100 may include movement detectors of different types. The movement detectors 128 may operate continuously or only when the communications device 108 has been enabled. In the embodiments discussed below, reference may be made to accelerometers, though it will be understood that other movement detectors may be used as appropriate.

The pen 100 further comprises a movement verification module 130. The movement verification module 130 is used to determine whether detected movements of the pen 100 correspond to the authenticating mark. For example, where the authenticating mark comprises a signature produced by a pen, the pen will need to perform a certain sequence of movements when writing that signature. Those movements may be stored in memory (e.g. memory 114) in communication with the movement verification module 130, or constitute part of the module 130 itself. When the accelerometers 128 record a sequence of movements corresponding to those stored in that memory, the pen 100 or communications device 108 may be activated to send the payment vehicle identifier to the payment terminal 102, or to send an authentication or confirmation signal to the payment terminal 102 to confirm that a payment vehicle associated with a previously sent payment vehicle identifier may be used to effect the electronic transaction.

Alternatively to the module 130, the communications device 108 may send the sequence of movements to the payment terminal 102. The payment terminal may then verify those movements using the methods set out above for verifying a signature by, for example, representing the movements as a series of virtual pen strokes such as would be produced on pad 106, or by comparing the sequence of movements to a sequence of movements stored remotely.

The pen 100 may be involved in transactions of a variety of transaction values (i.e. total basket amount). To that end, the memory 114 may comprise a threshold transaction value. When the payment terminal 102 requests a payment vehicle identifier, the request may comprise a basket amount or transaction value. The communications device 108 may check whether that amount or value is equal to or less than the threshold transaction value. If so, then the transaction is approved without requiring verification. If not, then the authentication mark is required before the transaction can be authorised. Alternatively, the communications device 108 may send the threshold transaction value to the payment terminal 102 along with the payment vehicle identifier. If the payment terminal 102 determines the transaction amount or basket value to exceed the threshold transaction value, then the authorisation mark must be produced before the transaction can be authorised. If the payment terminal 102 determines that the transaction amount or basket value does not exceed the threshold transaction value, then the transaction is automatically approved.

For use with the above pen 100 and for writing implements in accordance with present teachings more generally, the payment vehicle can conceivably be any form of payment vehicle associated with funds for effecting electronic transactions at a payment terminal. The payment vehicle may be a "stored value card" such as a credit card or debit card. In this case, the payment vehicle identifier will comprise the card number and may also comprise the expiry date and CVV or proxies or surrogates for those details. Where the payment vehicle is a virtual card, there may be no expiry date. The payment vehicle may instead comprise a bank account from which funds can be directly debited. In this case, the payment vehicle details will comprise the bank account number and may also comprise the bank-state-branch number or other necessary identifying details.

In FIG. 1, a power source 132 is also provided. The power source 132 may be rechargeable or may comprise a removable battery. The power source 132 provides power to each of the component of the writing implement that requires it—for example, the communications module 108, accelerometer module 128 and payment vehicle selector 116. The power connections are shown in solid lines, communications connections are illustrate in broken lines as many of the components may be separated into further subcomponents or may be combined into a fewer number of components, without affecting the function of the device 100. All such variations are intended to fall within the scope of the present disclosure. Also, some features (e.g. grip 126, selector 116, display 122) are accessible or visible from outside the pen 100 whereas other components are housed within the pen 100 and are not visible. It will be understood that components of the pen 100 may be made accessible or inaccessible as needed, without deviating from the intended function of those components and without deviating from the scope of the present disclosure.

Figure 2:
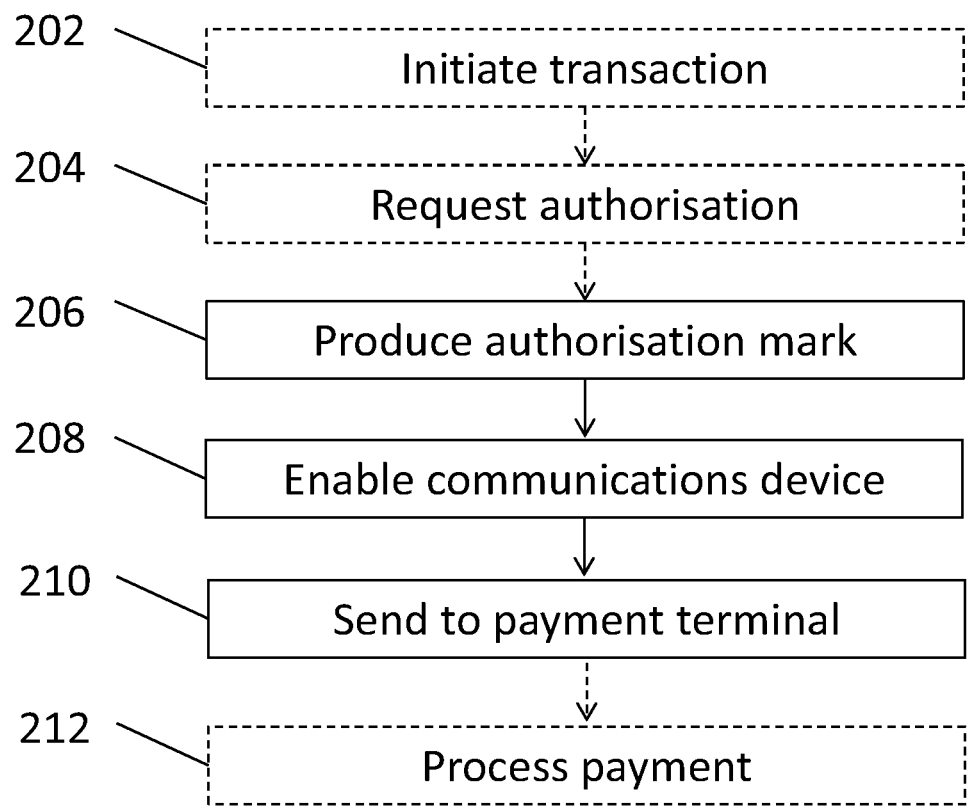
FIG. 2 is a method for effecting an electronic transaction using a writing implement such as the writing implement of FIG. 1.

FIG. 2 illustrates a method 200 for performing a transaction between a writing implement such as the pen 100, and a payment terminal such as point-of-sale terminal 102 of FIG. 1. The essential steps performed on the writing implement are shown in solid lines and broadly comprise:

Step 206: producing the authentication mark;
Step 208: enabling the communications device; and
Step 210: sending information to a payment terminal.

In addition to the above steps, in practice a transaction will often be initiated before authorisation is required (step 202). After initiation the payment terminal will request authorisation to use the payment vehicle to fund the electronic transaction (step 204). After that authorisation has been given, the payment terminal will process the transaction (step 212).

Initiating a transaction (step 202) can be done using any method. Currently, in an in-store context checkout is often effected by scanning the barcodes of a basket of items and then requesting payment. Alternatively, the items or their value may be manually entered into a payment terminal. Details of the payment vehicle (i.e. a payment vehicle identifier) are then required so that the transaction can take place. Those details can be provided by any of the mechanisms described above. For example, the writing implement may be tapped against (or brought near to) a NFC reader so that the NFC chip in the writing implement can be read and the payment vehicle details acquired.

In some cases, the writing implement may supply a threshold transaction value when supplying the payment vehicle details. If the value of the basket is equal to or lower than the threshold then the transaction is approved automatically and nothing more needs to be done. If the value of the basket exceeds the threshold then authorisation is required. Alternatively, authorisation may be required when no threshold is provided to the terminal or the terminal is not configured to receive such a threshold value.

When authorisation is required, the payment terminal will request authorisation from the user (204). That request may be received by the communications device that proceeds to determine whether or not to authorise the transaction. The request may also involve the merchant requesting the user authorise the transaction using traditional mechanisms (e.g. PIN).

Authorisation can be given in various ways, resulting in production of an authorisation mark (Step 206). Such authorisation by the user inputting a PIN into the payment terminal as performed on existing payment terminals. The user may alternatively sign using the nib of the writing implement. That signature may be produced in ink or, where applicable, on a signature capture pad. In the former case the mark is the signature. In the latter case, if the signature is verified electronically, the confirmation that the signature is correct comprises the mark. In other embodiments, the authorisation involves reading a biomarker. Such a biomarker may be the fingerprint or thumbprint of the user that is read using a reader (e.g. grip 126) of the writing implement. That biomarker is compared to a stored representation of the biomarker (e.g. in memory 114 of FIG. 1) and, if the biomarkers correspond to each other a confirmation is produced, the confirmation comprising the authorisation mark. Such a comparison may also be applied where authentication involves recording a gesture (i.e. a sequence of movements) performed with the writing implement and detected using accelerometers such as using device 128 of FIG. 1.

If the writing implement is used to produce the authentication mark, then once it is produced the communications device will be enabled (step 208) for sending an authorisation signal to the payment terminal (step 210). If the authentication process fails (e.g. the thumbprint or fingerprint as scanned, or the gesture as detected, does not match that in memory) then the communications device will send a failed authorisation message so the transaction will be declined.

Once the payment terminal receives the authorisation, the transaction will be processed using, among others, known settlement processes (step 212).

Notably, other processes described above with reference to FIG. 1—such as selection of a particular payment vehicle—may be integrated into the method of FIG. 2 and any such combination of methods and disclosure with reference to the figures is intended to fall within the scope of the present disclosure.

Figure 3:
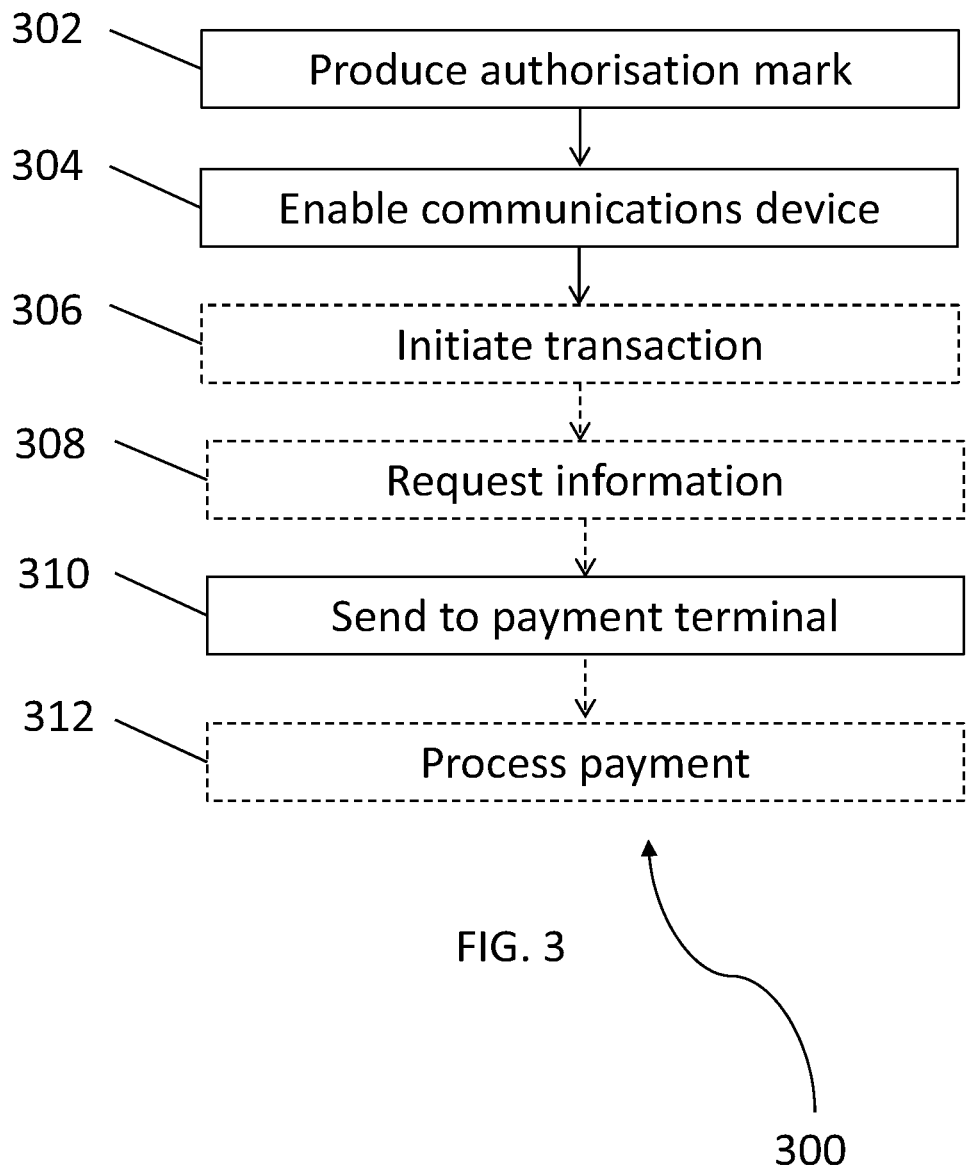
FIG. 3 is an alternative method for effecting an electronic transaction using a writing implement such as the writing implement of FIG. 1.

FIG. 3 illustrates a method 300 for performing a transaction between a writing implement such as the pen 100, and a payment terminal such as point-of-sale terminal 102 of FIG. 1. The essential steps performed on the writing implement are shown in solid lines and broadly comprise:

Step 302: producing the authentication mark;
Step 304: enabling the communications device; and
Step 310: sending information to a payment terminal.

The above steps of method 300 facilitate, in effect, pre-approval for a transaction since the authorisation can be generated before the transaction is initiated, or before the writing implement needs to transmit a payment vehicle identifier to the payment terminal. Pre-approval can save time at check-out since all that is required is for the payment vehicle identifier and authorisation to be concurrently transmitted to the payment terminal to authorise transactions of any transaction value. Pre-approval can also be useful where the authorisation mark is a biomarker such as a heartbeat monitor (the biomarker reader 126 of FIG. 1 can be configured to provide this functionality) that endeavors to identify the user through certain heartbeat characteristics, since the time over which the heartbeat is recorded may be longer than is desirable when attempting to authorise payment during the checkout process.

The authorisation mark is produced (step 302) and the communications device is enabled (304) before information such as is requested by the payment terminal. Thus, during production of the authorisation mark, enabling of the communications device or after enabling the communications device, the transaction is initiated in the same manner as for step 202.

Once initiated, information such as a payment vehicle identifier and authorisation mark are requested by the payment terminal (step 308). In response, the payment vehicle identifier and authorisation are sent from the writing implement to the payment terminal (step 310).

As with method 200, after authorisation has been given the payment terminal will process the transaction (step 312).

Figure 4:
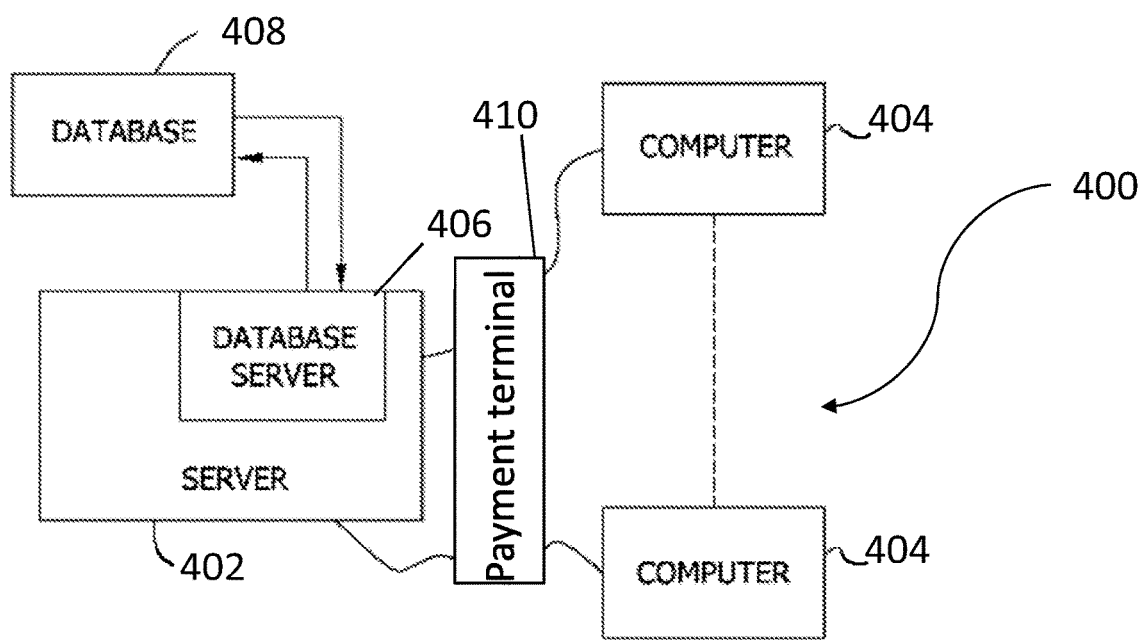
FIG. 4 is a system, comprising a writing implement such as the writing implement of FIG. 1, for effecting an electronic transaction.

FIG. 4 is a simplified block diagram of an exemplary network-based system 400 used for effecting an electronic transaction. System 400 is a client/server system that may be utilized for storage and delivery of data, such as user entitlements. More specifically, in the example embodiment, system 400 includes a server system 402, which may be managed by a bank or other financial institution, a value-added services provider or a third party. Server system 402 may also comprise a plurality of server systems including, for example, at least one server system of a financial institution such as a bank, and at least one value-added servicer server system. The system 400 also includes at least one client computer system 404, embodied in the present case by writing implements in accordance with present teachings. Presently the system 400 includes a client system interface or payment terminal 410, connected to server system 402 and through which the writing implements 404 can effect electronic transactions. In practice, there is likely to be a large number of client system interfaces or payment terminals 410.

A database server 406 is connected to database 408, which stores user accounts and/or user bank accounts, and account data such signatures, biomarkers and other information that can be used to verify authorisation marks. In one embodiment, centralized database 408 is stored on server system 402 and can be accessed by potential users at one of client systems 404 interacting through a payment terminal 410. In an alternative embodiment, database 408 is stored remotely from server system 402 and may be non-centralized or decentralized. Database 408 may store electronic files. Electronic files may include user accounts and user account data, user bank accounts and user bank account data, and authorisation marks in any format suitable for storage in database 408 and for delivery using system 400.

Database 408 may also store user account data including at least one of a cardholder name, a cardholder address, an account number, facial features (for facial recognition), fingerprint or thumbprint features (for recognition using scanner 126) and other account identifiers (e.g. a PIN). Database 408 may also store merchant data including a merchant identifier that identifies each merchant registered to transactions using a writing implement as presently described.

The database 408 may also be a non-transitory computer readable medium storing or embodying a computer program for effecting an electronic transaction using a writing implement as presently described. The program may include at least one code segment executable by a computer to instruct the computer to perform a method as described herein, for example with reference to FIG. 3.

Figure 5:
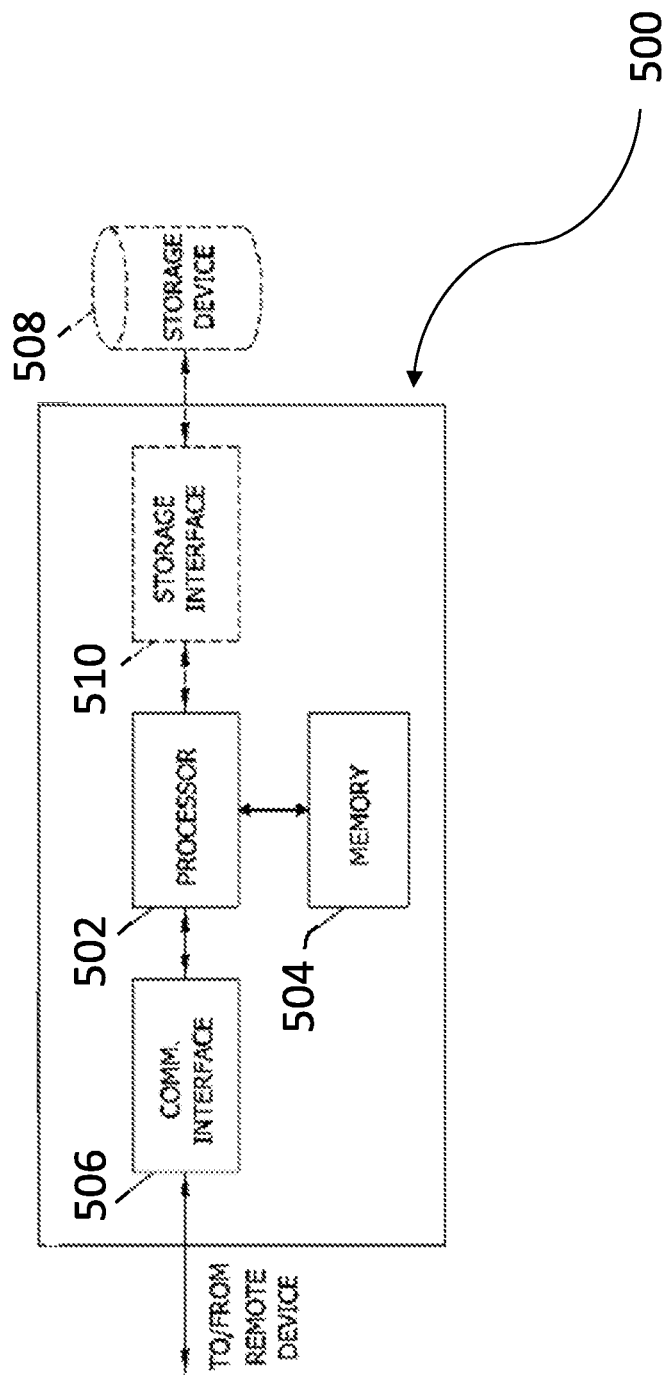
FIG. 5 is a schematic embodiment of a writing implement, showing the computational components of that implement.

FIG. 5 illustrates an exemplary configuration of a computing device 500, similar to device 404 of FIG. 4. Computing device 500 comprises a writing implement.

Computing device 500 includes a processor 502 for executing instructions such as managing authentication of biomarkers, gestures and the like, and transmission of authorisation signals and payment vehicle identifiers to the payment terminal. Instructions may be stored, for example, in a memory area 504 or other computer-readable media. Processor 502 may include one or more processing units (e.g., in a multi-core configuration).

Processor 502 is operatively coupled to a communications device or interface 506 such that server computing device 500 is capable of communicating with a remote device such as a payment terminal 410 (shown in FIG. 4). For example, communication interface 506 may receive requests from a payment terminal 410.

Processor 502 may also be operatively coupled to storage device 508, which may comprise memory 114 of FIG. 1. Storage device 508 is any computer-operated hardware suitable for storing and/or retrieving data. In some embodiments, storage device 508 is integrated in server computing device 500. For example, server computing device 508 may include one or more solid-state hard disk drives as storage device 508. In other embodiments, storage device 508 is external to server computing device 500 and may be accessed through the payment terminal. For example, the payment vehicle may be a credit card and authorisation may involve determining whether a signature produced by the writing implement corresponds with a signature stored on the server of the issuing bank. Storage device 508 may include multiple storage units such as hard disks or solid state disks in a redundant array of inexpensive disks (RAID) configuration. Storage device 508 may include a storage area network (SAN) and/or a network attached storage (NAS) system.

In some embodiments, processor 500 is operatively coupled to storage device 508 via a storage interface 510. Storage interface 510 is any component capable of providing processor 502 with access to storage device 508. Storage interface 510 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 502 with access to storage device 508.

In operation, the processor 502, coupled to a memory device (including memory device 504 and storage device 508), is configured to execute computer program steps to implement a method for effecting an electronic transaction using a writing implement. The computer program steps may include steps executable to cause the processor to produce, in a writing implement according to any preceding claim, the authenticating mark, activate the communications device upon production of the authenticating mark, and send the payment vehicle details from the communications device to the payment terminal. The processor may further be configured by the computer program steps to receive, at the communications device, a request for payment vehicle details before producing the authentication mark. The processor may further be configured by the computer program steps to send the payment vehicle details and a transaction authentication signal to the payment terminal.

The computer system 500 may be instructed to perform a method for effecting an electronic transaction between a writing implement and payment terminal by a computer program embodied on a non-transitory computer readable medium, such as memory device 408 or storage device 508. The program stored on the device 408, 508 would include at least one code segment, and most likely many thousands of code segments, executable by a computer to instruct the computer to perform the requested operations.

Similarly, the program may be stored remotely. To this end, the computer system may constitute a client computer system of a network-based system for effecting an electronic transaction between a writing implement and payment terminal.

Many modifications and variations of the present teachings will be apparent to the skilled person in light of the present disclosure. All such modifications and variations are intended to fall within the scope of the present disclosure. Moreover, to the extent possible, features form one of the embodiments described herein may be used in one or more other embodiments to enhance or replace a feature of the one or more other embodiments. All such usage, substitution and replacement is intended to fall within the scope of the present disclosure.

The invention claimed is:

1. A writing implement for effecting an electronic transaction via a payment terminal, the writing implement comprising:
   a communications device comprising a memory for storing a plurality of payment vehicle identifiers associated with a plurality of payment vehicles from which funds can be drawn for effecting the electronic transaction;
   a payment vehicle selector accessible for contact by a user in allowing the user to select one of the plurality of payment vehicles for effecting the electronic transaction, the payment vehicle selector being on an exterior of the writing implement the payment vehicle selector including a button and a display, the button being of the type selected from a movable button, a depressible button, and a virtual button, wherein, the display is configured to display the plurality of payment vehicles with the button being configured to allow for the user to select one of the plurality of payment vehicles while displayed by the display; and
   a writing member for producing an authenticating mark to authenticate use of the selected payment vehicle,
   wherein, the communications device is configured to transmit the payment vehicle identifier associated with the selected payment vehicle to the payment terminal.

2. A writing implement according to claim 1, wherein the communications device comprises one or both of:
   a transmitter for wirelessly transmitting the payment vehicle identifier associated with the selected payment vehicle to the payment terminal; and
   a near-field communications (NFC) chip.

3. A writing implement according to claim 1, wherein at least one of the plurality of payment vehicles comprises a stored value card.

4. A writing implement according to claim 1, wherein the writing member comprises a nib for producing a signature that is verifiable against a stored signature associated with the selected payment vehicle.

5. A writing implement according to claim 1, further comprising:
   at least one movement detector configured to detect movements of the writing implement; and
   a movement verification module for determining whether detected movements of the writing implement correspond to the authenticating mark.

6. A writing implement according to claim 5, wherein the communications device transmits the payment vehicle identifier associated with the selected payment vehicle after verification that the detected movements correspond to the authenticating mark.

7. A writing implement according to claim 1, further comprising:
   at least one movement detector configured to detect movements of the writing implement corresponding to the authenticating mark; and
   a movement transmitter for transmitting detected movements to the payment terminal for verifying whether the detected movements correspond to the authenticating mark.

8. A writing implement according to claim 1, further comprising a memory for storing a threshold transaction value and for sending the threshold transaction value to the payment terminal, the threshold transaction value defining a transaction amount below which no authentication is required for use of the selected payment vehicle.

9. A writing implement according to claim 1, wherein the writing member comprises a writing tip for writing the authenticating mark.

10. A writing implement according to claim 1, wherein the writing member comprises a virtual signature tip for producing the authenticating mark on a signature capture pad on the payment terminal.

11. A writing implement according to claim 10, wherein the communications device is configured to receive, from the payment terminal, a signal comprising the authentication mark produced on the signature capture pad, the writing implement further comprising a mark verification module for:
   storing an authentication mark associated with the selected payment vehicle; and
   verifying that the authentication mark corresponds to an authentication mark associated with the selected payment vehicle.

12. A writing implement according to claim 11, wherein the communications device is configured to transmit one or both of:
   the payment vehicle identifier associated with the selected payment vehicle to the payment terminal upon verification that the authentication mark corresponds to the authentication mark associated with the selected payment vehicle; and
   a confirmation signal to the payment terminal, to confirm that the electronic transaction can be effected, upon verification that the authentication mark corresponds to the authentication mark associated with the selected payment vehicle.

13. A writing implement according to claim 1, wherein the writing member comprises a grip, the grip comprising a fingerprint or thumbprint scanner for scanning a fingerprint or thumbprint of a user of the writing implement, wherein the writing implement further comprises:
   a memory for storing a fingerprint template or thumbprint template of the user; and
   a print verifier for determining if a scanned fingerprint or thumbprint corresponds to the fingerprint template or thumbprint template and the authenticating mark comprises a confirmation from the verifier that the scanned fingerprint or thumbprint corresponds to the fingerprint template or thumbprint template, and
   wherein the communications device is configured to transmit the payment vehicle identifier associated with the selected payment vehicle after receipt of the verifier.

14. A writing implement according to claim 1, further comprising a transaction memory for storing transaction details for the electronic transaction after the electronic transaction has been effected.

15. A writing implement according to claim 14, wherein the communications device is configured to receive the transaction details from the payment terminal.

* * * * *